(12) United States Patent
Yun et al.

(10) Patent No.: US 12,202,090 B2
(45) Date of Patent: Jan. 21, 2025

(54) TANDEM CONTROL SYSTEM FOR MACHINE TOOL AND METHOD FOR CONTROLLING SAME

(71) Applicant: DN SOLUTIONS CO., LTD., Changwon-si (KR)

(72) Inventors: Chul Yun, Gimhae-si (KR); Jooyong Park, Changwon-si (KR); Taeho Oh, Changwon-si (KR); Myongsu Oh, Gimha-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 353 days.

(21) Appl. No.: 17/785,335

(22) PCT Filed: Dec. 11, 2020

(86) PCT No.: PCT/KR2020/018210
§ 371 (c)(1),
(2) Date: Jun. 14, 2022

(87) PCT Pub. No.: WO2021/125714
PCT Pub. Date: Jun. 24, 2021

(65) Prior Publication Data
US 2023/0023782 A1    Jan. 26, 2023

(30) Foreign Application Priority Data
Dec. 19, 2019    (KR) .................... 10-2019-0170546

(51) Int. Cl.
*G05B 19/414* (2006.01)
*B23Q 15/12* (2006.01)

(52) U.S. Cl.
CPC ......... *B23Q 15/12* (2013.01); *G05B 19/4147* (2013.01); *G05B 2219/34013* (2013.01); *G05B 2219/34273* (2013.01)

(58) Field of Classification Search
CPC ...... G05B 19/4147; G05B 2219/34013; G05B 2219/34273
See application file for complete search history.

(56) References Cited

U.S. PATENT DOCUMENTS

2001/0002097 A1* 5/2001 Tsutsui .................... G05B 5/01
318/560
2007/0007926 A1   1/2007 Iwashita et al.
(Continued)

FOREIGN PATENT DOCUMENTS

JP         6049587 B2    12/2016
JP      2019080424 A     5/2019
(Continued)

OTHER PUBLICATIONS

International search report of PCT/KR2020/018210, Apr. 12, 2021, English translation.

*Primary Examiner* — Nathan L Laughlin
(74) *Attorney, Agent, or Firm* — STIP Law Group, LLC

(57) ABSTRACT

A tandem control system for a machine tool, according to the present invention, comprises: a numerical control unit; a main operation unit; a PLC which executes a control command via communication with the numerical control unit or the main operation unit; a servo drive which includes a notch filter unit and executes the control command from the PLC; a servo motor unit which is driven under the control of the servo drive; and a power conversion unit which is electrically connected to the servo motor unit and the servo drive so as to apply current to the servo motor unit, wherein the servo drive suppresses resonance due to the operation of the servo motor unit by controlling the application state of current transferred to the power conversion unit according to changes of notch &; filter coefficients calculated in real time at the notch filter unit.

6 Claims, 7 Drawing Sheets

(56) References Cited

U.S. PATENT DOCUMENTS

| | | | | |
|---|---|---|---|---|
| 2008/0180052 | A1* | 7/2008 | Iwashita | G05B 19/19 318/615 |
| 2019/0199267 | A1* | 6/2019 | Fujiwara | H02P 29/00 |
| 2020/0133208 | A1* | 4/2020 | Tsuneki | G05B 13/0265 |
| 2020/0201291 | A1* | 6/2020 | Egi | G06N 5/02 |
| 2022/0321043 | A1* | 10/2022 | Matsubara | H02P 23/04 |

FOREIGN PATENT DOCUMENTS

| | | | |
|---|---|---|---|
| KR | 101708739 | B1 | 2/2017 |
| KR | 101757267 | B1 | 7/2017 |

\* cited by examiner

[FIG. 1]
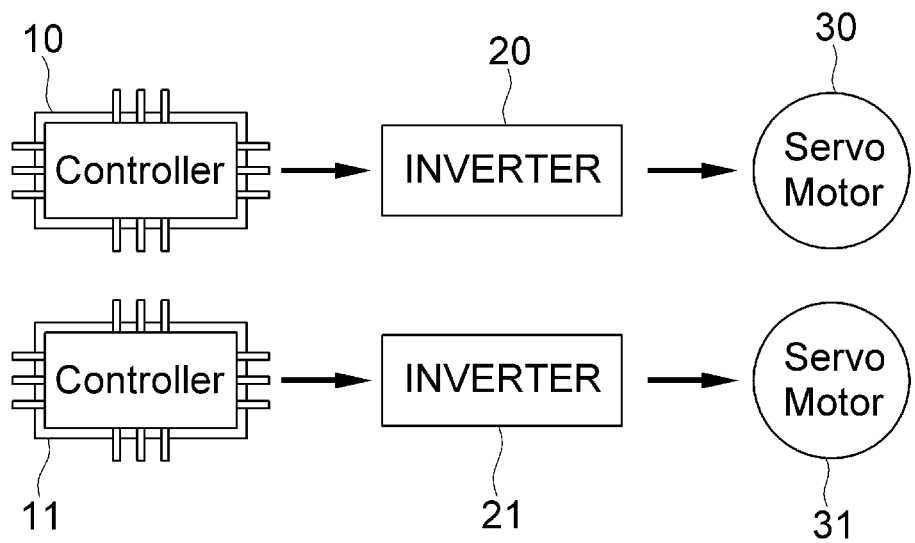
[FIG. 2]
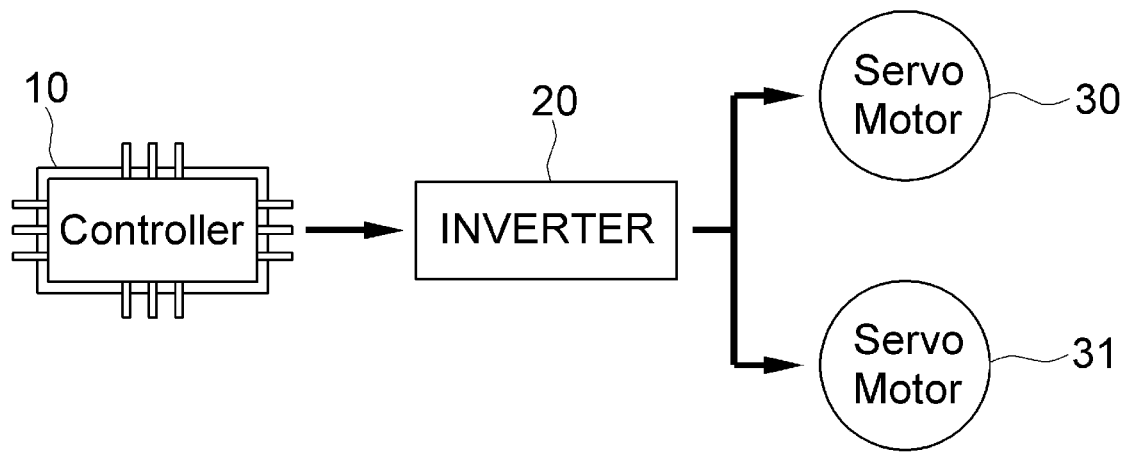

[FIG. 3]
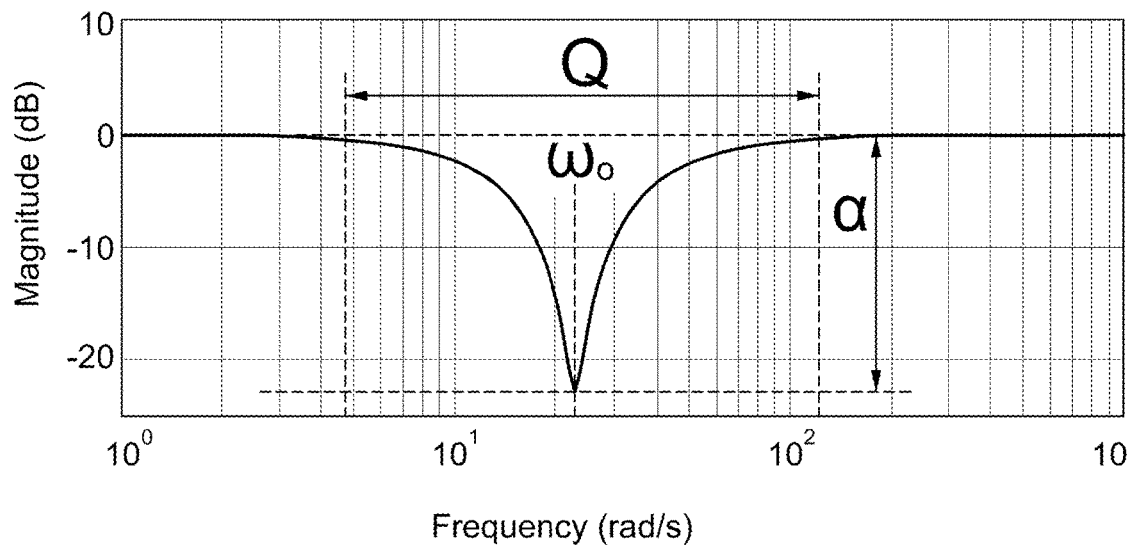
[FIG. 4]
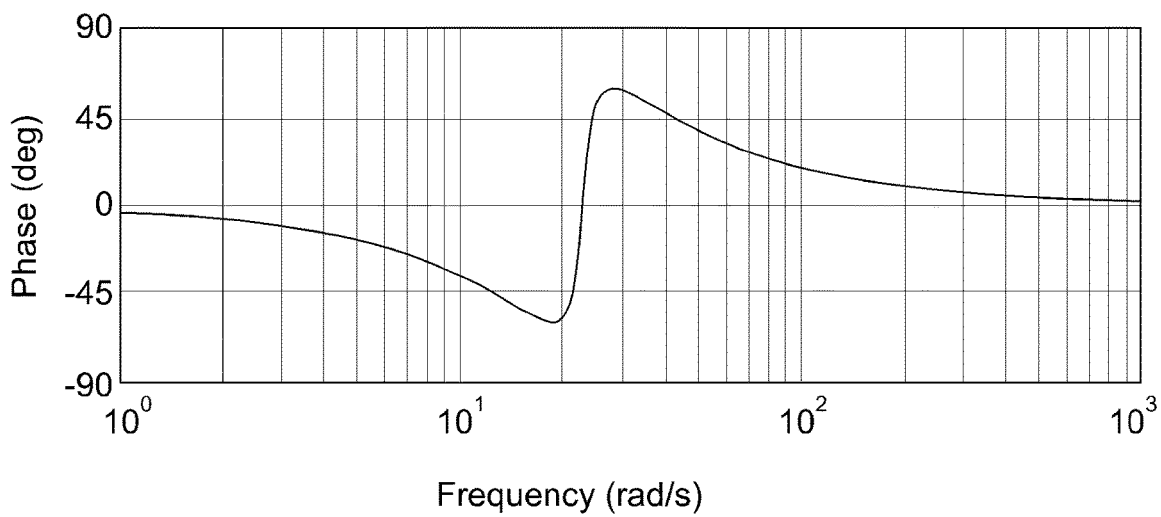

[FIG. 5]
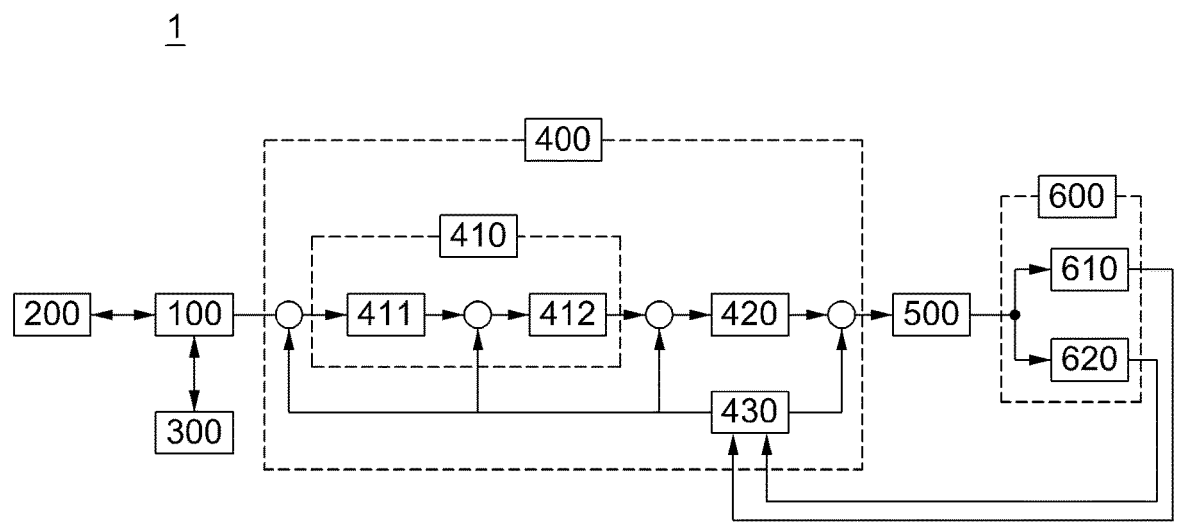

[FIG. 6]
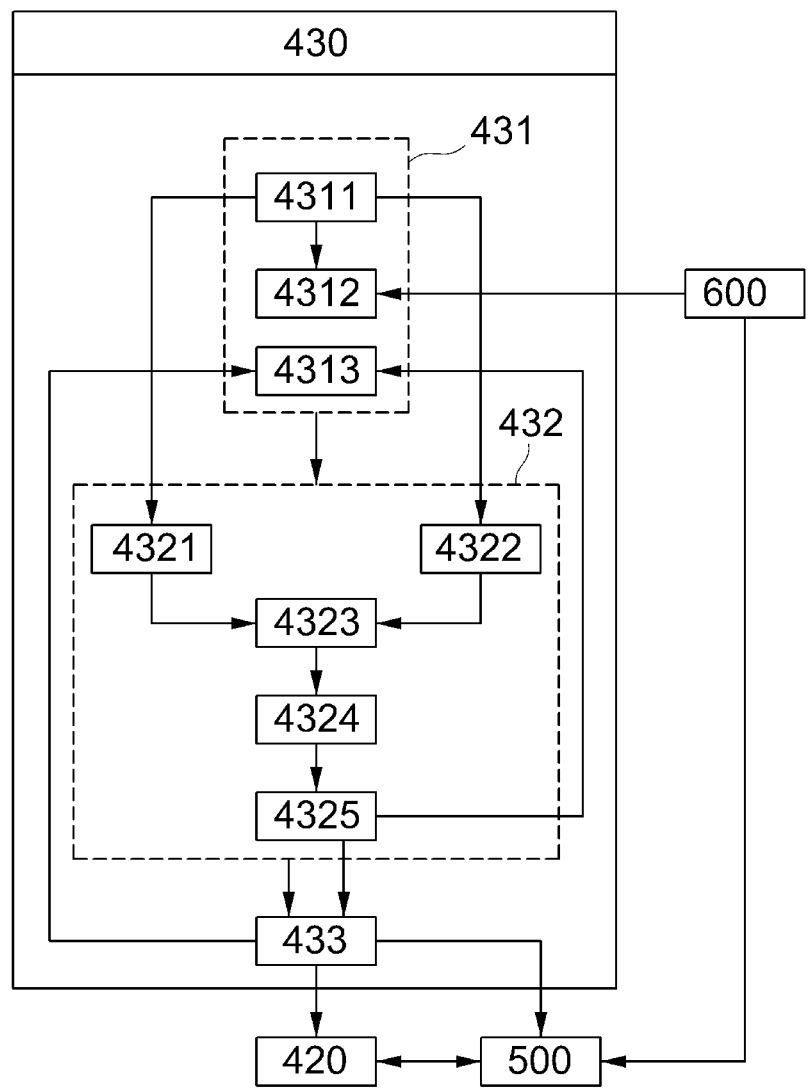

[FIG. 7]
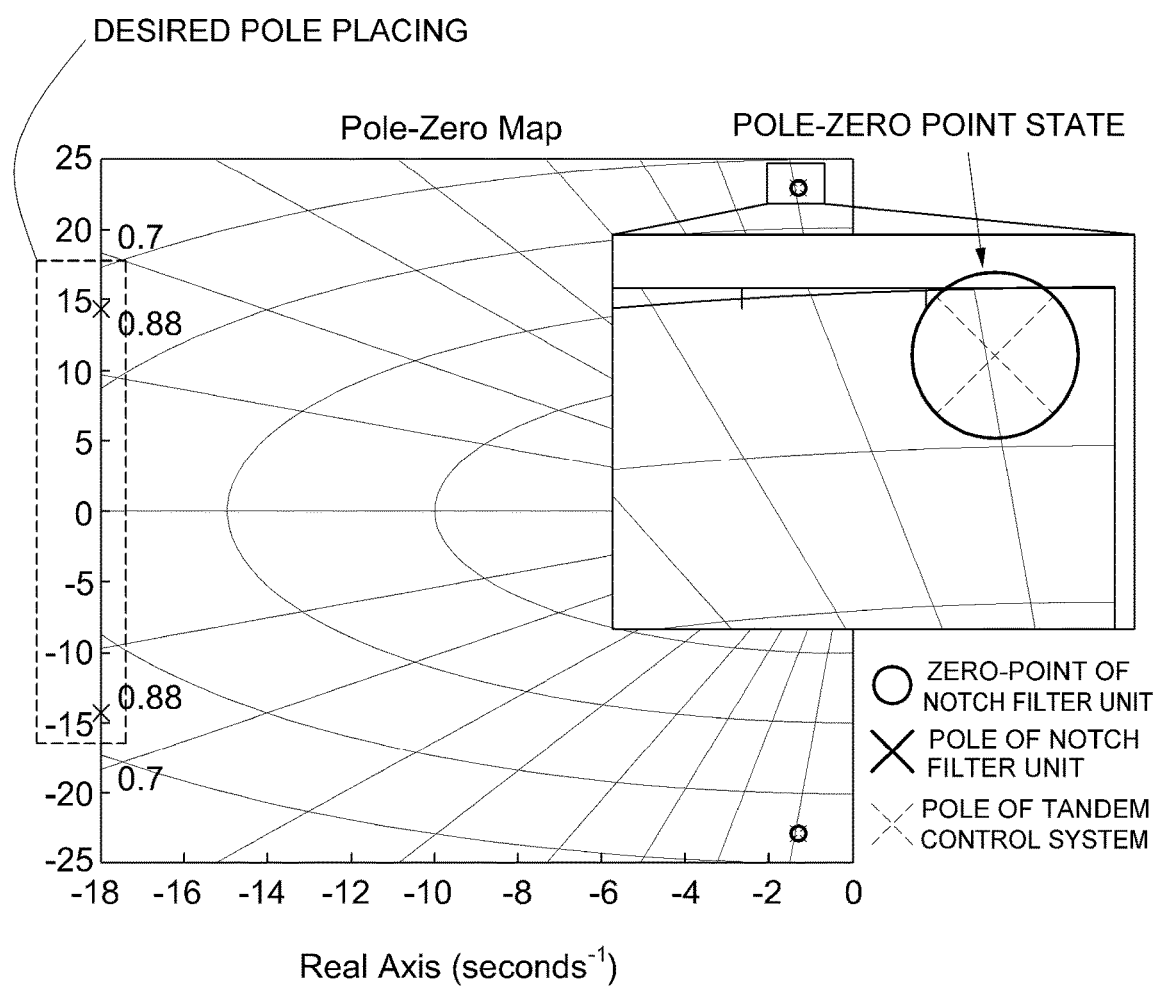

[FIG. 8]
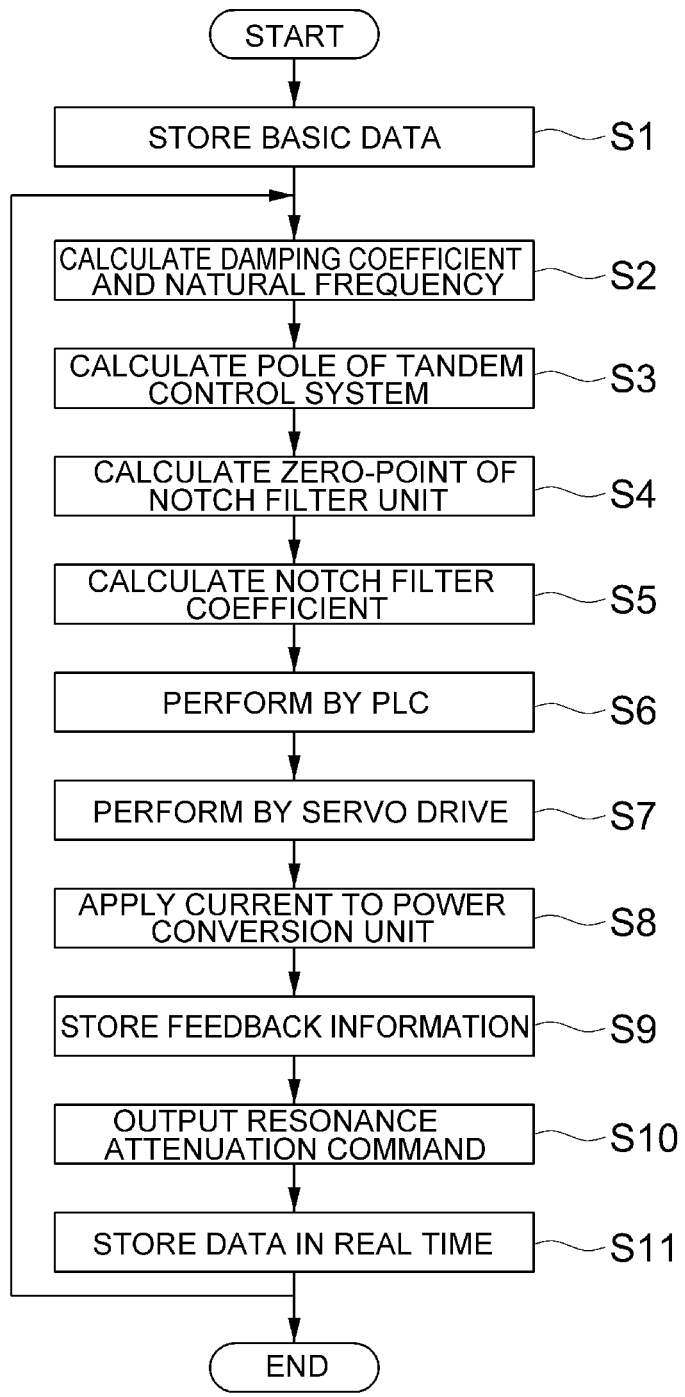

[FIG. 9]
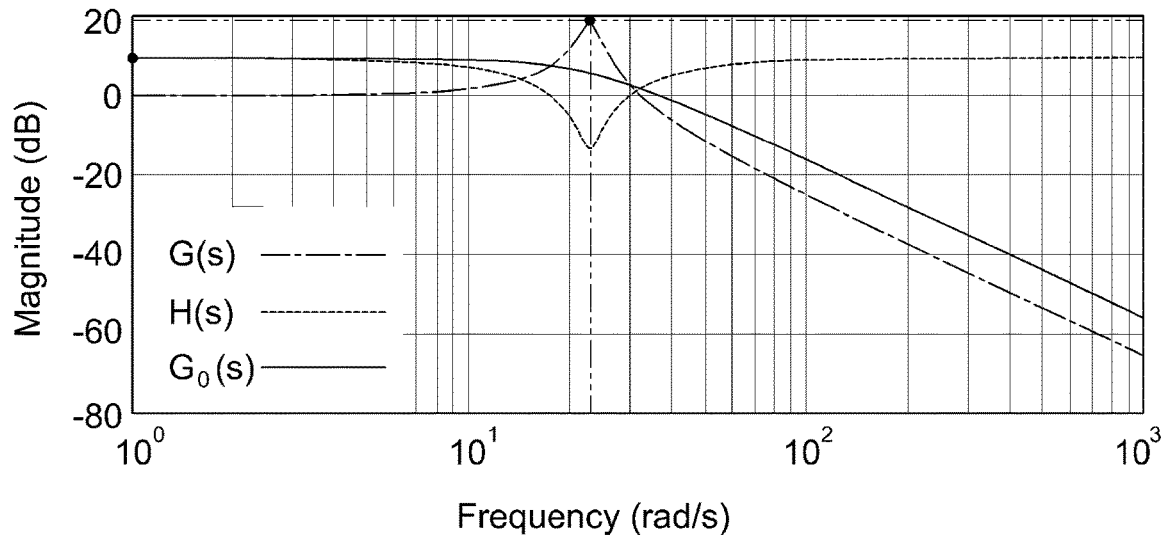
[FIG. 10]
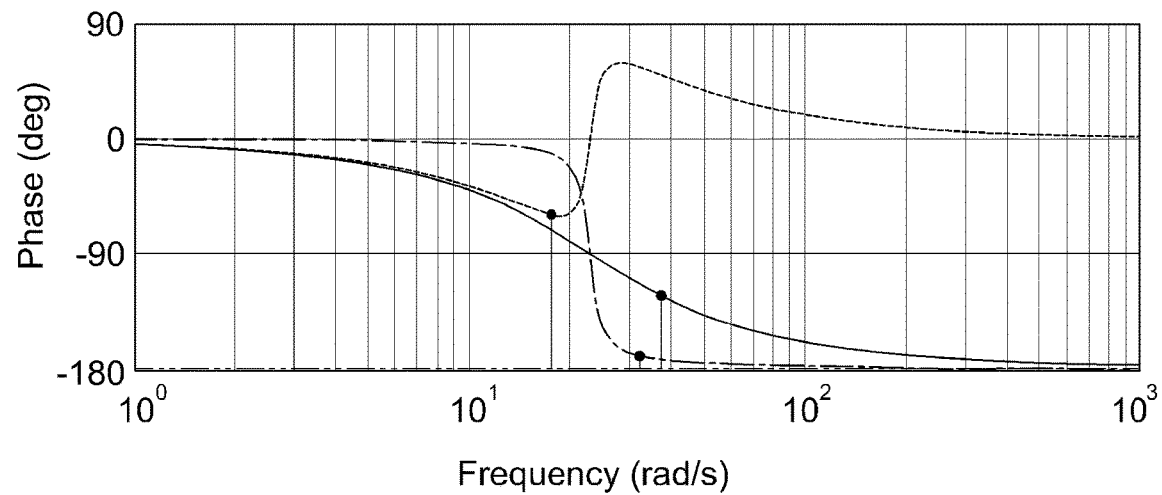

TANDEM CONTROL SYSTEM FOR MACHINE TOOL AND METHOD FOR CONTROLLING SAME

CROSS-REFERENCE TO RELATED APPLICATIONS

This application is the U.S. National Phase under 35 U.S.C. § 371 of International Application No. PCT/KR2020/018210 filed on Dec. 11, 2020, which in turn claims the benefit of Korean Application No. 10-2019-0170546 filed on Dec. 19, 2019, the disclosures of which are incorporated by reference into the present application.

FIELD OF THE DISCLOSURE

The present disclosure relates to a tandem control system for machine too and a method for controlling the same, and more particularly, to a tandem control system for a machine tool and a method for controlling the same which control resonance suppression which occurs when operating two servo motors as one power conversion unit and one servo drive in parallel through tandem control by calculating a notch filter coefficient of a notch filter unit real time by a notch filter control unit and adjusting an application state of current applied to a power conversion unit by the calculated notch filter coefficient in real time to enhance stability and reliability of a machine tool, enhance convenience of an operator, reducing manufacturing cost and maintenance cost, and promoting miniaturization.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used in various industrial sites for the purpose of the corresponding work.

The multi-tasking machining center, among the machine tools, refers to a turning center equipped with a multifunctional automatic tool changer (ATC) and a tool magazine in order to perform various types of processing such as turning machining, drilling, tapping, or milling. In the case of the multi-tasking machining center, an operator manually mounts a tool on a tool magazine when loading the tool required for machining or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated, and which is transferred to machine the workpiece, a palette used to prepare the workpiece to be machined, a main shaft coupled to a tool or the workpiece and configured to be rotated, and a tailstock and a steady rest configured to support the workpiece during machining.

In general, the machine tool is provided with a transfer unit configured to transfer the table, a tool post, the main shaft, the tailstock, and the steady rest along a transfer shaft in order to perform various types of machining.

In general, the machine tool uses a plurality of tools in order to perform various types of machining, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

In general, the machine tool is equipped with the automatic tool changer (ATC) configured to withdraw a specific tool from the tool magazine or remount the tool on the tool magazine based on an instruction of a numerical control unit in order to improve productivity of the machine tool.

In general, the machine tool is equipped with an automatic palette changer (APC) in order to minimize the non-processing time. The automatic palette changer (APC) automatically changes the palettes between a workpiece machining region and a workpiece loading region. The workpiece may be mounted on the palette.

In general, in the machine tool, a servo motor is used for driving the automatic tool changer (ATC), the automatic pallet changer (APC), the tailstock, or the vibration isolator.

As such, a device for finally controlling the ATC or the APC, the tailstock, or the vibration isolator by controlling the servo motor is referred to as a servo control device.

In particular, when a size is large or large force is required like a large automatic pallet changer (APC), one shaft is driven by operating two servo motors in parallel by productivity and economic factors and a technical factor in which sufficient torque cannot be obtained only by one servo motor, and this is referred to as tandem control.

However, as illustrated in FIG. 1, when two servo motors are used in the related art, one inverter and one servo drive are coupled to one servo motor in each of two servo motors in the servo control device in the related art. That is, the servo motors are operated in a multi inverter multi servo motor scheme in which a first inverter 20 and a first servo drive 10 are connected to a first servo motor 30 and a second inverter 21 and a second servo drive 11 are connected to a second servo motor 31.

However, in the case of the multi inverter multi servo motor, since a separate inverter and a separator servo drive should be combined for each servo motor, there is a problem in that the size of the apparatus, manufacturing cost and maintenance cost increase, and miniaturizing the machine tool cannot be promoted.

In order to solve such a problem, as illustrated in FIG. 2, a single inverter multi servo motor of a scheme of operating one inverter 20 and one servo drive 10 in parallel in two servo motors 30 and 31 is proposed.

However, unlike induction motors with slippage, since servo motors are permanent magnet type synchronous motors, the servo motors have no slippage, and a stable parallel operation is possible only when two servo motors are synchronized so that there is no speed deviation, otherwise, there was a problem in that the stability and reliability of the service control device is lowered, and finally, the stability and reliability and processing precision of the machine tool are lowered.

In order to solve the resonance suppression control problem, three conventional tandem control systems and control methods thereof are proposed.

First, a damping control device using an auxiliary inverter and an auxiliary winding, and a method therefor are provided, and this is a structure in which the main inverter and the auxiliary inverter are separately provided, and the servo motor and the auxiliary winding are formed, and problems such as manufacturing cost increases and large amounts of production difficulties still remain.

Second, as an active damping control device and a method thereof simply set the resonance suppression control as an empirical method, the reliability and stability of the servo control device are not still guaranteed and only the manufacturing cost increases because the active damping control device and the method thereof cannot actively cope with the actual resonance occurrence or many disturbances or variables.

Third, as by an apparatus and a method for reducing a pulsation using a load oscillation analyzer, the resonance suppression control is calculated by the empirical method, and a sensor capable of detecting the pulsation of the magnetic flux axis current should be provided, the manufacturing cost increases and as the resonance suppression control is performed without considering the actual resonance occurrence or real-time deformation amount according to the operating state of the apparatus, the accuracy and reliability are significantly reduced, and finally, there is a problem in that the machining precision and reliability of the machine tool are reduced.

Further, in general, there is a method for avoiding the resonance operation band or attenuating the resonance with a notch filter through the three tandem control systems and a control method thereof described above in order to suppress a resonance phenomenon.

As illustrated in FIGS. 3 and 4, the notch filter is generally used to suppress the resonance phenomenon, a resonance frequency ($\omega O$) of the notch filter, coefficients for an attenuation magnitude ($\alpha$) of the notch filter, and a bandwidth (Q) of the notch filter to find the coefficient should be obtained.

However, in general, there is a problem that the coefficient of the notch filter varies depending on the manufacturing time and design difference even for servo motors of the same model from the same manufacturer, and the coefficient of the notch filter varies depending on the manufacturer even for servo motors of the same capacity.

Moreover, as the resonance frequency, attenuation magnitude, and bandwidth of the notch filter generated during the operation of the machine tool are changed in real time, there a problem in that it takes a lot of time and money for equipment tuning or equipment setting to suppress resonance through tandem control for each machine tool, inconvenience of the operator is caused, and productivity is reduced.

Therefore, the development of a tandem control system for a machine tool using a notch filter and a control method therefore accurately calculate the notch filter coefficient that is changed in real time regardless of the capacity or type of the servomotor, output the resonance attenuation command through the calculated notch filter coefficient, and block the current transmitted to a power converter at a frequency at which resonance occurs by the output resonance attenuation command to suppress resonance.

Disclosure

SUMMARY

The present disclosure has been made in an effort to solve the above-mentioned problems, and an object of the present disclosure is to provide a tandem control system for a machine tool and a method for controlling the same which control resonance suppression which occurs when operating two servo motors as one power conversion unit and one servo drive in parallel through tandem control by calculating a notch filter coefficient of a notch filter unit in real time by a notch filter control unit and stably setting operating resonance suppression which occurs when operating two servo motors into one power conversion unit and one servo drive in parallel regardless of the type of servo motor or a capacity of the servo motor through tandem control as blocking or applying current transferred to the power conversion unit with the notch filter unit by the calculated notch filter coefficient in real time to enhance convenience of an operator and finally control an apparatus driven by an automatic tool exchanger or an automatic pallet changer to reduce manufacturing cost, enhance reliability by noise reduction, and promote miniaturization of the apparatus.

Further, another object of the present disclosure is to provide a tandem control system for a machine tool and a method for controlling the same which calculate the notch filter coefficient in real time by the notch filter control unit and output a resonance attenuation command by a command unit through a pole-zero point offset technique through the calculated notch filter coefficient, and adjust current applied to a first servo motor and a second servo motor by the power conversion unit as by applying the current transferred to the power conversion unit by the notch filter unit to maximize servo control precision, and reliability and stability of the automatic tool changer or the automatic pallet changer regardless of the type of servo motor unit through precise tandem control synchronized at all speeds and locations of two servo motors, and reduce maintenance cost.

In order to achieve the above-mentioned object, a tandem control system for a machine tool according to the present disclosure may include: a numerical control unit; a main operation unit; a PLC performing a control command through communication with the numerical control unit or the main operation unit; a servo drive having a notch filter unit and performing the control command of the PLC; a servo motor unit driven by controlling the servo drive; and a power conversion unit electrically connected to the servo motor unit and the servo drive to apply current to the servo motor unit, and the servo drive may perform resonance suppression according to an operation of the servo motor by adjusting an application state of the current applied to the power conversion unit according to a change in notch filter coefficient of the notch filter unit, which is calculated in real time.

Further, in another exemplary embodiment of the tandem control system for a machine tool according to the present disclosure, the servo drive may further include an output unit outputting an operation speed signal of the servo motor unit and a torque signal transferred to the power conversion unit, and a notch filter control unit calculating the notch filter coefficient of the notch filter unit in real time, and controlling whether to apply the current transferred to the power conversion unit by the calculated notch filter coefficient.

Further, in another exemplary embodiment of the tandem control system for a machine tool according to the present disclosure, the servo motor unit of the tandem control system for a machine tool may include a first servo motor and a second servo motor connected in parallel to each other, and according to the real-time change of the notch filter coefficient of the notch filter unit, resonance suppression which occurs during tandem control of the first servo motor and the second servo motor may be controlled by adjusting, in real time, whether the current transferred to the first servo motor and the second servo motor, respectively is applied through the power conversion unit.

Further, in another exemplary embodiment of the tandem control system for a machine tool according to the present disclosure, the notch filter control unit of the tandem control system for a machine tool may include a memory unit storing information for the tandem control for suppressing the resonance generated during the parallel operation of the first servo motor and the second servo motor, an operating unit calculating the notch filter coefficient of the notch filter unit through the information stored in the memory unit, and a command unit performing the resonance suppression through the tandem control in real time by blocking the current applied to the power conversion unit by the notch filter unit through a resonance attenuation command according to a result of the operating unit.

Further, in another exemplary embodiment of the tandem control system for a machine tool according to the present disclosure, the memory unit of the tandem control system for a machine tool may include a basic data storage unit storing information on a maximum value of a linkage magnetic flux by an equivalent permanent magnet, an angular speed at an operation point, a DC gain of the notch filter unit, an inductance of a winding of a stator of the servo motor unit, a pole constant of the servo motor unit, state winding resistance of the servo motor unit, and a rotator inertia moment of a circuit thermo motor unit, a feedback data storage unit storing location and speed feedback information of the first servo motor generated when operating the first servo motor in parallel to the second servo motor and storing the location and speed feedback information of the second servo motor generated when operating the second servo motor in parallel to the first servo motor, and a real-time data storage unit storing a real-time notch filter coefficient of the notch filter unit calculated by the operating unit and a current resonance attenuation command output from the command unit.

Further, in another exemplary embodiment of the tandem control system for a machine tool according to the present disclosure, the operating unit of the tandem control system for a machine tool may include a damping coefficient calculation unit calculating a damping coefficient of the servo motor unit by data stored in the basic data storage unit, a natural frequency calculation unit calculating a natural frequency of the servo motor unit by the data stored in the basic data storage unit, a pole calculation unit calculating a pole of the tandem control system based on the data stored in the basic data storage unit, a calculation value of the damping coefficient calculation unit, and a calculation value of the natural frequency calculation unit, a zero-point calculation unit calculating the zero point of the notch filter unit based on the data stored in the basic data storage unit, the calculation value of the damping coefficient calculation unit, and the calculation value of the natural frequency calculation unit, and a coefficient calculation unit calculating the notch filter coefficient based on the data stored in the basic data storage unit, the calculation value of the damping coefficient calculation unit, the calculation value of the natural frequency calculation unit, a calculation value of the pole calculation unit, and a zero-point value of the zero-point calculation unit.

Further, in another exemplary embodiment of the tandem control system for a machine tool according to the present disclosure, the command unit of the tandem control system for a machine tool may output a resonance attenuation command through a pole-zero point offset technique based on the data stored in the basic data storage unit, the calculation value of the damping coefficient calculation unit, the calculation value of the natural frequency calculation unit, the calculation value of the pole calculation unit, the zero-point value of the zero-point calculation unit, and a notch filter coefficient value of the coefficient calculation unit.

Further, in another exemplary embodiment of the tandem control system for a machine tool according to the present disclosure, the output unit of the tandem control system for a machine tool may include a speed signal output unit outputting an operation speed signal of the servo motor unit according to a location command transferred from the numerical control unit and a feedback signal transferred from the feedback data storage unit, and a torque signal output unit outputting an effective torque signal transferred to the power conversion unit in order to drive the servo motor unit according to a speed signal transferred from the speed signal output unit and the feedback signal transferred from the feedback data storage unit.

In order to achieve another object, a method for controlling a tandem control system for a machine tool according to the present disclosure may include: storing basic data for a servo motor unit and a notch filter unit for tandem control; calculating a damping coefficient and a natural frequency of the servo motor unit; calculating a pole of a tandem control system; calculating a zero-point of a notch filter unit; calculating a notch filter coefficient of the notch filter unit through the stored basic data, and the calculated damping coefficient and natural frequency of the servo motor unit, the pole of the tandem control system, and the zero-point of the notch filter unit; performing, by a PLC, a control command for communication with a numerical control unit and or a main cooperation unit; performing, by a servo drive, the control command transferred from the PLC; applying, by a power conversion unit, current to a servo motor unit including a first servo motor and a second servo motor according to a signal of the servo drive; storing location and speed feedback information of the first servo motor generated when operating the first servo motor in parallel to the second servo motor and location and speed feedback information of the second servo motor generated when operating the second servo motor in parallel to the first servo motor; and outputting a resonance attenuation command in real time according to the calculated notch filter coefficient, and resonance suppression through the tandem control may be performed in real time by blocking current applied to the power conversion unit by the notch filter unit through the notch filter coefficient calculated in real time and the resonance attenuation command.

Further, in another exemplary embodiment of the method for controlling a tandem control system for a machine tool, the method for controlling a tandem control system for a machine tool may further include after the outputting of the resonance attenuation command, storing a current notch filter coefficient calculated in real time and the resonance attenuation command output in real time.

The tandem control system for a machine tool and the method for controlling the same according to the present disclosure control resonance suppression which occurs when operating two servo motors as one power conversion unit and one servo drive in parallel through tandem control by calculating a notch filter coefficient of a notch filter unit in real time by a notch filter control unit and stably setting operating resonance suppression which occurs when operating two servo motors into one power conversion unit and one servo drive in parallel regardless of the type of servo motor or a capacity of the servo motor through tandem control as blocking or applying current transferred to the power conversion unit with the notch filter unit by the calculated notch filter coefficient in real time to enhance convenience of an operator and finally control an apparatus driven by an automatic tool exchanger or an automatic pallet changer to reduce manufacturing cost, and enhance reliability by noise reduction, and can be universally used regardless of the type of servo motor and the capacity of the serve motor, thereby increasing compatibility of the tandem control system and the method for controlling the same.

Further, the tandem control system for a machine tool and the method for controlling the same according to the present disclosure has an effect in that as resonance suppression for resonance generated when operating two servo motors in parallel by one power unit and a power conversion unit is performed by a scheme of applying or blocking the current transferred to the power conversion unit by the notch filter unit according to a resonance attenuation command through the notch filter coefficient calculated in real time, an unnecessary component is removed to achieve miniaturization of the machine tool and the tandem control system for the machine tool and maximize spatial utilization.

Moreover, the tandem control system for a machine tool and the method for controlling the same according to the present disclosure has an effect in that as precise resonance suppression control of two servo motors is performed in real time through tandem control utilizing the notch filter unit through the pole-zero point offset technique by suppressing the resonance generated when operating two servo motors in parallel by one power unit and the power conversion unit according to feedback information of the first and second servo motors transferred from a feedback data storage unit in real time, and the notch filter coefficient and a current resonance attenuation command transferred from a data storage unit in real time, the precision and the reliability of the service control device of the automatic tool changer or the automatic pallet changer can be maximized, and the stability and processing efficiency of the machine tool can be increased.

Moreover, the tandem control system for a machine tool and the method for controlling the same according to the present disclosure has an effect in that as the suppression control of the resonance generated when operating two servo motors in parallel by one power unit and the power conversion unit is automatically performed in real time regardless of the type of servo motor and the capacity of the servo motor, the convenience of the operator is achieved and a non-processing time is minimized, thereby maximizing the productivity of the machine tool.

DESCRIPTION OF THE DRAWINGS

FIG. 1 is a conceptual view of a multi inverter multi servo motor in which one inverter and one servo drive are combined with one servo motor in the related art.

FIG. 2 is a conceptual view of a single inverter multi servo motor in which one inverter and one servo drive are combined with two servo motors to perform tandem control in the related art.

FIGS. 3 and 4 are graphs for describing frequency characteristics of a notch filter in the related art.

FIG. 5 is a block diagram for a configuration of a tandem control system for a machine tool according to an exemplary embodiment of the present disclosure.

FIG. 6 is a block diagram for a configuration of a notch filter control unit of a servo drive of the tandem control system for a machine tool according to an exemplary embodiment of the present disclosure.

FIG. 7 is a graph for describing a process of outputting a resonance attenuation command through a pole-zero point offset technique in a command unit of the tandem control system for a machine tool according to an exemplary embodiment of the present disclosure.

FIG. 8 is a procedure diagram of a method for controlling a tandem control system for a machine tool according to an exemplary embodiment of the present disclosure.

FIG. 9 and FIG. 10 are graphs for describing a resonance suppression control effect through tandem control by the tandem control system for a machine tool and the method for controlling the same according to an exemplary embodiment of the present disclosure.

DETAILED DESCRIPTION OF CERTAIN INVENTIVE EMBODIMENT

Hereinafter, a tandem control system for a machine tool and the method for controlling the same according to an exemplary embodiment of the present disclosure will be described in detail with respect to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present Disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

FIG. 5 is a block diagram for a configuration of a tandem control system for a machine tool according to an exemplary embodiment of the present disclosure and FIG. 6 is a block diagram for a configuration of a notch filter control unit of a servo drive of the tandem control system for a machine tool according to an exemplary embodiment of the present disclosure. FIG. 7 is a graph for describing a process of outputting a resonance attenuation command through a pole-zero point offset technique in a command unit of the tandem control system for a machine tool according to an exemplary embodiment of the present disclosure. FIG. 8 is a procedure diagram of a method for controlling a tandem control system for a machine tool according to an exemplary embodiment of the present disclosure. FIGS. 9 and 10 are graphs for describing a resonance suppression control effect through tandem control by the tandem control system for a machine tool and the method for controlling the same according to an exemplary embodiment of the present disclosure.

A tandem control system 1 for a machine tool according to an exemplary embodiment of the present disclosure will be described with reference to FIGS. 5 to 7. As illustrated in FIGS. 5 and 6, the tandem control system 1 for a machine tool according to an exemplary embodiment of the present disclosure includes a numerical control unit 100, a main operation unit 200, a programmable logic controller (PLC) 300, a servo drive 400, a servo motor unit 600, and a power conversion unit 500.

The numerical control unit 100 includes a numerical control (NC) or a computerized numerical control (CNC), and is embedded with various numerical control programs. That is, a driving program of a servo motor, an operation program of a tool, etc., are embedded in the numerical control unit 100, and the corresponding program is automatically loaded and operated according to the driving of the numerical control unit. Further, the numerical control unit 100 communicates with the main operation unit 200, the PLC 300, and the servo drive 400 by a predetermined protocol.

In addition, the numerical control unit 100 is transferred with feedback information from a first servo motor or a second servo motor of the servo motor unit 600 used for driving an automatic tool changer (ATC) or an automatic pallet changer (APC). More specifically, the numerical control unit 100 is transferred with feedback information for a location and a speed of the first servo motor 610 or the second servo motor 620 from a feedback storage unit 4312 of a memory unit 431 of a notch filter control unit 430 to be described below.

The main operation unit 200 includes a screen display program, and a data input program according to screen display selection, and displays a software switch on the display screen according to the output of the screen display program, and recognizes on/off of the software switch to perform a function of issuing an input/output command of a machine operation.

Further, although not particularly limited thereto, the main operation unit 200 is provided with a monitor that is installed on a housing, a case, or one side of the machine tool to display various function switches or buttons and various information.

The programmable logic controller (PLC) 300 performs communication according to a predetermined protocol with the numerical control unit 100 or the main operation unit 200, and performs a function of executing a control command through such communication. That is, the PLC 300 operates by receiving a control command according to the numerical control program of the numerical control unit 100 or the main operation unit 200.

In addition, after receiving the control command from the numerical control unit 100 or the main operation unit 200 and performing the control command, the PLC 300 outputs the control command to the numerical control unit 100, and transfers the control command to the servo drive 400 through the main operation unit 200. As necessary, the PLC 300 may also transfer a real-time control command to the servo drive 400 from a user through the main operation unit 200.

The servo drive 400 performs the control command of the PLC 300. That is, the servo drive 400 controls the driving of a servo motor of a servo motor unit 600 to be described later through the control command of the PLC 300, and finally controls the driving of various components of the machine tools driven by the servo motor, such as the automatic tool changer (ATC) or the automatic pallet changer (APC), a tailstock, and a vibration isolator driven by the servo motor. The servo drive 400 transfers a control result to the PLC 300 through a contact or communication by a predetermined protocol.

In addition, the servo drive 400 is transferred with the feedback information from a first servo motor 610 or a second servo motor 620 of the servo motor unit 600 used for driving the automatic tool changer (ATC) or the automatic pallet changer (APC). More specifically, the numerical control unit 100 is transferred with feedback information for a location and a speed of the first servo motor 610 or the second servo motor 620 from the feedback storage unit 4312 of the memory unit 431 of a first notch filter control unit 430 to be described below.

The servo motor unit 600 is driven according to the control of the servo drive 400.

As illustrated in FIG. 5, the servo motor unit 600 of the servo control apparatus 1 of the machine tool according to an exemplary embodiment of the present disclosure includes the first servo motor 610 and the second servo motor 620.

The first servo motor 610 and the second servo motor 620 are connected in parallel to the power conversion unit 500 to be described later and operate in parallel through the current applied from the power conversion unit 500 according to a control signal of the servo drive.

In addition, according to the real-time change of the notch filter coefficient of the notch filter unit, resonance suppression which occurs during tandem control of the first servo motor and the second servo motor is performed by adjusting, in real time, whether the current transferred to the first servo motor and the second servo motor, respectively is applied through the power conversion unit.

In addition, in the servo motor unit 600, the first servo motor 610 or the second servo motor 620 is driven according to corresponding sequence information and location information or a program according to the control of the servo drive 400.

The power conversion unit 500 is electrically connected to the servo motor unit 600 and the servo drive 400. In addition, the power conversion unit 500 applies current to the servo motor unit 600 according to a contact signal of the servo drive 400.

As such, the tandem control system for the machine tool according to the present disclosure invention calculates the notch filter coefficient of the notch filter unit in real time by the notch filter control unit 433, and blocks or applies the current transferred to the power conversion unit 500 by the notch filter coefficient calculated in real time by the notch filter unit 420 to perform the resonance suppression which occurs according to the parallel operation of each of the first servo motor 610 and the second servo motor 620 of the servo motor unit 600. Specifically, the notch filter unit 420 which is transferred with a resonance attenuation command and a resonance attenuation command signal output from a command unit 433 of the servo drive adjusts the current applied or blocked to each of the first servo motor 610 and the second servo motor 620 in real time by blocking the current applied to the power conversion unit 500 at a specific frequency and supplying the current applied to the power conversion unit 500 at another frequency to perform the resonance suppression which occurs during the parallel operation of the first servo motor 610 and the second servo motor 620 through the tandem control using the notch filter unit.

Therefore, the resonance suppression which occurs when operating two servo motors as one power conversion unit and one servo drive in parallel through tandem control by calculating a notch filter coefficient of a notch filter unit in real time by a notch filter control unit and stably setting operating resonance suppression which occurs when operating two servo motors into one power conversion unit and one servo drive in parallel regardless of the type of servo motor or a capacity of the servo motor through tandem control as blocking or applying current transferred to the power conversion unit with the notch filter unit by the calculated notch filter coefficient in real time to enhance convenience of an operator and finally control an apparatus driven by an automatic tool exchanger or an automatic palette changer to reduce manufacturing cost, and enhance reliability by noise reduction, and can be universally used regardless of the type of servo motor and the capacity of the serve motor, thereby increasing compatibility of the tandem control system and the method for controlling the same.

As illustrated in FIG. 5, the servo drive 400 of the tandem control system 1 for the machine tool according to an exemplary embodiment of the present disclosure includes an output unit 410, the notch filter unit 420, and the notch filter control unit 430.

Although not illustrated in the figure, the servo drive 400 of the tandem control system for the machine tool may further include a controller as necessary. Such a controller is installed inside the servo drive 400, and a detailed control command decoding program or various processing programs, and driving programs are separately embedded. Further, the controller performs the communication by a predetermined protocol with the numerical control unit 100, the main operation unit 200, the PLC 300, the servo motor unit 600, and the power conversion unit 500.

As necessary, the main operation unit 200 may transfer the control command of the main operation unit to the servo drive 400 through the PLC 300 directly without passing through the numerical control unit 100.

As such, since detailed control command decoding programs or a separate control programs are also embedded in the controller of the servo drive 400 to be described below, the servo drive 400 executes the command through the main operation unit 200 and the PLC 300 without receiving a driving command of the servo motor unit 500 from the numerical control unit 100 to drive the servo motor unit 600 to be described below.

Therefore, since the detailed control command performed by the numerical control unit 100 may be performed by the controller of the servo drive 400, a servo drive function may be performed by programming only another numerical control and a protocol function, and as a result, it is possible to drive various programs through the servo drive, thereby maximizing compatibility of equipment and achieving convenience of the user.

The output unit 410 outputs an operation speed signal of the servo motor unit 600 and a torque signal transferred to the power conversion unit 500.

Further, as illustrated in FIG. 5, the output unit 400 of the tandem control system 1 for the machine tool according to an exemplary embodiment of the present disclosure includes a speed signal output unit 411 and a torque signal output unit 412.

The speed signal output unit 411 outputs an operation speed signal of the servo motor unit 600 according to the location command transferred from the numerical control unit 100 and feedback signals of the first servo motor 610 and the second servo motor 620 transmitted from the feedback data storage unit 4312.

Specifically, when the speed signal output unit 411 outputs the operation speed signal of the servo motor unit 600 according to the location command transferred from the numerical control unit 100 initially in a state before the first servo motor 610 and the second servo motor 620 are operated in parallel when the tandem system is initially driven. Thereafter, feedback information of the first servo motor 610 generated as the first servo motor 610 and the second servo motor 620 of the servo motor 600 are operated in parallel according to the speed command output by the speed signal output unit 411 is transferred to the feedback data storage unit 4312 and after the initial driving, the operation speed signal of the servo motor unit 600 is output according to the feedback signals of the first servo motor 610 and the second servo motor 620 transferred through the feedback data storage unit 4312 and the location command transferred from the numerical control unit 100.

The torque signal output unit 412 outputs an effective torque signal transferred to the power conversion unit 500 in order to drive the servo motor unit 600 according to the speed signal transferred from the speed signal output unit 411 and the feedback signal transferred from the feedback data storage unit 4312.

Specifically, when the torque signal output unit 412 outputs the effective torque signal transferred to the power conversion unit 500 in order to drive the servo motor unit 600 according to the speed command transferred from the speed signal output unit 411 initially in the state before the first servo motor 610 and the second servo motor 620 are operated in parallel when the tandem system is initially driven. Thereafter, the feedback information of the first servo motor 610 and the feedback information of the second servo motor 620 generated as the first servo motor 610 and the second servo motor 620 of the servo motor 600 are driven and operated in parallel by the power conversion unit 500 according to the effective torque signal output by the torque signal output unit 412 is transferred to the feedback data storage unit 4312 and after the initial driving, the effective torque signal transferred to the power conversion unit 500 is output according to the feedback signal transferred through the feedback data storage unit 4312 and the operation speed signal from the speed signal output unit 411.

The notch filter unit 420 blocks the current applied to the power conversion unit at a specific frequency and does not filter but transfers the current applied to the power conversion unit 500 at another frequency.

The notch filter control unit 430 calculates the notch filter coefficient of the notch filter unit in real time, and controls whether to apply the current transferred to the power conversion unit by the calculated notch filter coefficient. Specifically, the notch filter control unit 430 calculates a damping coefficient and a natural frequency of the servo motor before initial driving of the tandem control system, and calculates the notch filter coefficient of the notch filter unit. Further, the notch filter control unit 430 performs a function of suppression controlling the resonance generated according to the parallel operation of the first server motor 610 and the second servo motor 620 by outputting the resonance attenuation command for blocking the transfer to the power conversion unit 500 through the notch filter unit after the first servo motor 610 and the second servo motor 620 of the servo motor unit 600 are operated in parallel after the initial driving of the tandem control system.

All of the output unit 410, the notch filter unit 420, and the notch filter control unit 430 may be installed inside the servo drive 400, and a detailed control command decoding program or various processing programs, and driving programs may be separately embedded.

Further, the output unit 410, the notch filter unit 420, and the notch filter control unit 430 may perform the communication by a predetermined protocol with the numerical control unit 100, the main operation unit 200, the PLC 300, the servo motor unit 600, and the power conversion unit 500.

Accordingly, the tandem control system for a machine tool according to the present disclosure removes an unnecessary component as an effect in that as resonance suppression for resonance generated when operating two servo motors in parallel by one power unit and a power conversion unit is performed by a scheme of applying or blocking the current transferred to the power conversion unit by the notch filter unit according to a resonance attenuation command through the notch filter coefficient calculated in real time to achieve miniaturization of the machine tool and the tandem control system for the machine tool and maximize spatial utilization.

As illustrated in FIGS. 5 and 6, the notch filter control unit 430 of the servo drive 400 of the tandem control system 1 for the machine tool according to an exemplary embodiment of the present disclosure includes the memory unit 431, an operating unit 432, and the command unit 433.

The memory unit 431 stores various pieces of information for the tandem control for suppressing the resonance generated during the parallel operation of the first servo motor and the second servo motor.

The operating unit 432 calculates the notch filter coefficient of the notch filter unit 420 in real time through information stored in the memory unit 431.

The command unit 433 performs the resonance control through the tandem control in real time as the current applied to the power conversion unit is blocked or transferred by the notch filter unit through the resonance attenuation command according to a result of the operating unit 431.

The memory unit 431, the operating unit 432, and command unit 433 may be installed inside the notch filter control unit 430, and a detailed control command decoding program or various processing programs, and driving programs may be separately embedded.

Further, the memory unit 431, the operating unit 432, and the command unit 433 may perform the communication by a predetermined protocol with the numerical control unit 100, the main operation unit 200, the PLC 300, the servo motor unit 600, the power conversion unit 500, the output unit 410, and the notch filter unit 420.

As illustrated in FIGS. 5 and 6, the memory unit 431 of the notch filter control unit 430 of the servo drive 400 of the tandem control system 1 for the machine tool according to an exemplary embodiment of the present disclosure includes a basic data storage unit 4311, the feedback data storage unit 4312, and a real-time data storage unit 4313.

The basic data storage unit 4311 stores information on a maximum value of a linkage magnetic flux by an equivalent permanent magnet, an angular velocity at an operation point, a DC gain of the notch filter unit, an inductance of a winding of a stator of the servo motor unit, a pole constant of the servo motor unit, state winding resistance of the servo motor unit, and a rotator inertia moment of a circuit thermo motor unit.

The operator may perform the basic data storage through the numerical control unit 100 or the main operation unit 200 and also store the basic data in the PLC 300 in the form of the program.

The feedback data storage unit 4312 stores the location and speed feedback information of the first servo motor generated when operating the first servo motor 610 in parallel to the second servo motor 620 and stores the location and speed feedback information of the second servo motor generated when operating the second servo motor in parallel to the first servo motor.

As described above, the feedback data storage unit 4312 is electrically connected to the output unit 410, the notch filter unit 420, the power conversion unit 500, the real-time data storage unit 4313, the servo motor unit 600, the numerical control unit 100, the main operation unit 200, and the PLC 300 to perform the communication by a predetermined protocol.

The real-time data 4312 stores the real-time notch filter coefficients of the notch filter unit calculated by the operating unit and the current resonance attenuation command output from the command unit.

As described above, the real-time data storage unit 4312 is electrically connected to the output unit 410, the notch filter unit 420, the power conversion unit 500, the feedback data storage unit 4312, the servo motor unit 600, the numerical control unit 100, the main operation unit 200, and the PLC 300 to perform the communication by a predetermined protocol.

As illustrated in FIG. 5, the operating unit 432 of the notch filter control unit 430 of the servo drive 400 of the tandem control system 1 for the machine tool according to an exemplary embodiment of the present disclosure includes a damping coefficient calculation unit 4312, a natural frequency calculation unit 4322, a pole calculation unit 4323, a zero point calculation unit 4324, and a coefficient calculation unit 4325.

The damping coefficient calculation unit 4321 calculates a damping coefficient of the servo motor unit based on data stored in the basic data storage unit.

The natural frequency calculation unit 4322 calculates a natural frequency of the servo motor unit based on the data stored in the basic data storage unit.

The pole calculation unit 4323 calculates a pole of the tandem control system based on the data stored in the basic data storage unit, a damping coefficient calculation value of the damping coefficient calculation unit, and a natural frequency calculation value of the natural frequency calculation unit.

The zero-point calculation unit 4324 calculates a zero point of the notch filter unit based on the data stored in the basic data storage unit, the damping coefficient calculation value of the damping coefficient calculation unit, and the natural frequency calculation value of the natural frequency calculation unit.

The coefficient calculation unit 4325 calculates a notch filter coefficient based on the data stored in the basic data storage unit, the damping coefficient calculation value of the damping coefficient calculation unit, the natural frequency calculation value of the natural frequency calculation unit, the pole calculation value of the tandem control system of the pole calculation unit, and the zero-point calculation value of the notch filter unit of the zero-calculation unit.

The coefficient calculation unit 433 calculates a resonance attenuation command through a pole zero-point offset technique based on the data stored in the basic data storage unit, the damping coefficient calculation value of the damping coefficient calculation unit, the natural frequency calculation value of the natural frequency calculation unit, the pole calculation value of the tandem control system of the pole calculation unit, the zero-point calculation value of the notch filter unit of the zero-calculation unit, and the notch filter coefficient value of the coefficient calculation unit.

Therefore, by the tandem control system for the machine tool according to the present disclosure, as precise resonance suppression control of two servo motors is performed in real time through tandem control utilizing the notch filter unit through the pole-zero point offset technique by suppressing the resonance generated when operating two servo motors in parallel by one power unit and the power conversion unit according to feedback information of the first and second servo motors transferred from a feedback data storage unit in real time, and the notch filter coefficient and a current resonance attenuation command transferred from a data storage unit in real time, the precision and the reliability of the service control device of the automatic tool changer or the automatic palette changer can be maximized, and the stability and processing efficiency of the machine tool can be increased.

Further, by the tandem control system for the machine tool according to the present disclosure, as the suppression control of the resonance generated when operating two servo motors in parallel by one power unit and the power conversion unit is automatically performed in real time regardless of the type of servo motor and the capacity of the servo motor, the convenience of the operator is achieved and a non-processing time is minimized, thereby maximizing the productivity of the machine tool.

A calculation principle of the operating unit 432 and the command unit 433 of the notch filter control unit 430 will be described with reference to FIGS. 5 to 7. That is, the operating unit 432 and the command unit 433 of the notch filter control unit 430 calculate the notch filter coefficient in real time according to the following principle, and outputs the resonance attenuation command based on the calculated notch filter coefficient.

If a linearized state equation is obtained using the Taylor series in which state variables are expressed as $X=X0+\Delta X$ in a steady state, the linearized state equation is calculated as Equation 1.

$$\frac{d\Delta x}{dt} = A(x_0)\Delta x + B(x_0)\Delta u \quad \langle \text{Equation 1}\rangle$$

$$\Delta x^t = [\,\Delta i^r_{ds}\ \ \Delta i^r_{as}\ \ \Delta i^\omega_{ds}\ \ \Delta i^\omega_{as}\ \ \Delta^r_{re}\ \ \Delta\delta\,]$$

$$\Delta u^t = [\,\Delta v^r_{ds}\ \ \Delta v^r_{as}\ \ \Delta v^\omega_{ds}\ \ \Delta v^\omega_{as}\ \ \Delta\omega^\omega_{re}\,]$$

$$A = \begin{bmatrix} -\dfrac{R_s}{L_s} & \omega_s & 0 & 0 & 0 & 0 \\ -\omega_s & -\dfrac{R_s}{L_s} & 0 & 0 & 0 & 0 \\ 0 & 0 & -\dfrac{R_s}{L_s} & 0 & -\dfrac{\Phi_f \sin\delta_0}{L_s} & -\dfrac{\Phi_f \omega_0 \cos\delta_0}{L_s} \\ 0 & 0 & 0 & -\dfrac{R_s}{L_s} & -\dfrac{\Phi_f \omega_0 \cos\delta_0}{L_s} & \dfrac{\Phi_f \sin\delta_0}{L_s} \\ 0 & \dfrac{3P_f^2 \Phi_f}{2J} & \dfrac{3P_f^2 \Phi_f \sin\delta_0}{2J} & \dfrac{3P_f^2 \Phi_f \cos\delta_0}{2J} & 0 & \dfrac{3P_f^2 \Phi_f (i^\omega_{d0}\cos\delta_0 - i^\omega_{d0}\sin\delta_0)}{2J} \\ 0 & 0 & 0 & 0 & -1 & 0 \end{bmatrix}$$

$$B = \begin{bmatrix} (1/L_s) & 0 & 0 & 0 & 0 \\ 0 & (1/L_s) & 0 & 0 & 0 \\ 0 & 0 & (1/L_s) & 0 & i^\omega_{a0} \\ 0 & 0 & 0 & (1/L_s) & i^\omega_{d0} \\ 0 & 0 & 0 & 0 & 0 \\ 0 & 0 & 0 & 0 & 1 \end{bmatrix}$$

However, in Equation 1, the parallel operation tandem control system is too complicated to evaluate the stability.

Therefore, in order to simplify Equation 1, when Equation 1 is arranged while it is assumed that a mechanical time constant of the servo motor is sufficiently larger than an electrical time constant, Equation 1 is calculated as Equation 2.

$$p\begin{bmatrix}\Delta\omega^r_{re}\\ \Delta\delta\end{bmatrix} = \begin{bmatrix} -\dfrac{3}{2}\dfrac{P_f^2 \Phi_f^2}{J}\dfrac{R_s}{\omega_0^2 L_s^2} & \dfrac{3}{2}\dfrac{P_f^2 \Phi_f^2}{JL_s} \\ -1 & 0 \end{bmatrix}\begin{bmatrix}\Delta\omega^r_{re}\\ \Delta\delta\end{bmatrix} + \quad \langle \text{Equation 2}\rangle$$

$$\begin{bmatrix} \dfrac{3}{2}\dfrac{P_f^2 \Phi_f}{J}\dfrac{R_s}{\omega_0^2 L_s^2} & -\dfrac{3}{2}\dfrac{P_f^2 \Phi_f}{JR_s} & 0 \\ 0 & 0 & 1 \end{bmatrix}\begin{bmatrix}\Delta v^r_{as}\\ \Delta v^\omega_{as}\\ \Delta\omega^\omega_{re}\end{bmatrix}$$

Therefore, when a transfer function is obtained from Equation 2, Equations 3 and 4 are obtained.

$$G(s) = \frac{\omega_n^2}{s^2 + 2\zeta\omega_n s + \omega_n^2} \quad \langle \text{Equation 3}\rangle$$

That is, the pole calculation unit 4323 is calculated by Equation 3.

In addition, the damping coefficient and the natural frequency of the servo motor unit of the tandem control system for parallel operation of Equation 3, which is a characteristic equation, which is a transfer function, is calculated by Equation 5.

$$H(s) = K_n \frac{s^2 + \alpha\left(\frac{\omega_o}{Q}\right)s + \omega_o^2}{s^2 + \left(\frac{\omega_o}{Q}\right)s + \omega_o^2}$$ ⟨Equation 4⟩

That is, the zero-point calculation unit 4324 is calculated by Equation 4.

$$\zeta = \sqrt{\frac{3}{2}} \frac{\sqrt{JL_s}}{2} \frac{P_f \phi_f}{J} \frac{R_s}{\omega_0^2 L_s^2}$$ ⟨Equation 5⟩

$$\omega_n = \sqrt{\frac{3}{2}} \frac{P_f \phi_f}{\sqrt{JL_s}}$$

That is, the damping coefficient calculation unit 4321 and the natural frequency calculation unit 4322 are calculated by Equation 4.

FIG. 7 is a conceptual view for the pole-zero point offset technique in a complex plane. As illustrated in FIG. 7, in general, response characteristics of the system during control may be interpreted by setting the denominator of the transfer function to 0. Accordingly, the pole of the tandem control system according to Equation 3 is displayed on the complex plane (indicated by the dashed line X in FIG. 7).

As illustrated in FIG. 7, the pole of the tandem control system expressed by Equation 3 is close to an imaginary axis, which means that the tandem control system which operates as the power converter resonates. That is, FIG. 7 becomes more stable toward the left with respect to the X-axis of FIG. 7 and shows an unstable state due to resonance toward the right.

When the pole ((indicated by a solid line X in FIG. 7) is arranged so as to cancel fundamental resonance component of the tandem control system which operates as one power conversion unit and allow the tandem control system to have desired performance by placing the zero point (indicated by a solid line O in FIG. 7) of the notch filter, which is the numerator part of Equation 4, at the location of the pole of the tandem control system, which is the denominator of Equation 3, stable tandem control in which the resonance is suppressed is possible, which is expressed by Equation 6.

$$G_o(s) = H(s)G(s) = K_n \frac{s^2 + \alpha\left(\frac{\omega_o}{Q}\right)s + \omega_o^2}{s^2 + \left(\frac{\omega_o}{Q}\right)s + \omega_o^2} \times \frac{\omega_n^2}{s^2 + 2\zeta\omega_n s + \omega_n^2}$$ ⟨Equation 6⟩

That is, the resonance attenuation command of the command unit is derived by Equation 6.

Thereafter, the resonance frequency and the natural frequency of the servo motor of the tandem control system among the notch filter coefficients may be set as in Equation 7.

$$\omega_0 = \omega_n$$ ⟨Equation 7⟩

As a result, as described above, by a pole placement method for the zero point (the numerator part of Equation 4) of the notch filter and the pole point (the denominator part of Equation 3) of the tandem control system, the notch filter coefficient shown in Equation 8 may be obtained.

$$\alpha = 2\zeta\omega_n \frac{Q}{\omega_o} = 2\zeta Q$$ ⟨Equation 8⟩

-continued $$Q = \alpha \frac{\omega_o}{2\zeta\omega_n} = \frac{\alpha}{2\zeta}$$

That is, the coefficient calculation unit 4325 is derived by Equation 8.

Respective factors in Equations 1 to 8 described above are as follows.

α1: High frequency gain limit value
δ: Torque angle between $V_t$ and $E_f$
'δ: Torque angle in transient state
Δδ: Linearized torque angle
Δu: Variable component of input variable
Δx: Variable component of state variable
$\Delta\omega^r_{re}$: Linearized rotor angular velocity
ζ: Attenuation integer
$\omega_0$: Angular velocity at operating point
$\omega^r_{re}$: Angular velocity of rotor
$\omega^\infty_{re}$: Predetermined angular velocity
$\omega_s$: Synchronous angular velocity
$i_{uvw}$: 3-phase current
$i^r_{ds}$, $i^r_{qs}$: Stator current of the $d^r$-$q^r$ axis of rotary coordinate system
$i^\infty_{ds}$, $i^\infty_{qs}$: $d^\infty$-$q^\infty$ axis stator current of predetermined coordinate system
$i^{r*}_{ds}$, $i^{r*}_{qs}$: Stator command current of the $d^r$-$q^r$ axis of rotary coordinate system
$i^{\infty*}_{qs}$, $i^{\infty*}_{qs}$: $d^\infty$-$q^\infty$ axis stator command current of predetermined coordinate system
Kn: DC gain of notch filter
$\omega_0$: Resonance frequency of notch filter
α: Attenuation magnitude of notch filter
Q: Notch filter bandwidth
$L_s$: Inductance of stator winding of motor
$P_f$: Extreme constant of motor
$R_s$: Resistance of stator winding of motor
$V_t$: Terminal voltage
$V_{uvw}$: 3-phae voltage
x: State variable
$x_0$: State variable at operating point
J: Inertial movement of motor rotor
S: σ+Jω (a represents a real number, Jω represents an imaginary number, that is, S represents a factor indicating a magnitude and a phase in a frequency space)

As described above, the tandem control system for a machine tool according to the present disclosure controls resonance suppression which occurs when operating two servo motors as one power conversion unit and one servo drive in parallel through tandem control by calculating a notch filter coefficient of a notch filter unit in real time by a notch filter control unit and stably setting operating resonance suppression which occurs when operating two servo motors into one power conversion unit and one servo drive in parallel regardless of the type of servo motor or a capacity of the servo motor through tandem control as blocking or applying current transferred to the power conversion unit with the notch filter unit by the calculated notch filter coefficient in real time to enhance convenience of an operator and finally controls an apparatus driven by an automatic tool exchanger or an automatic palette changer to reduce manufacturing cost, and enhance reliability by noise reduction, and the resonance which occurs when operating two servo motors in parallel by one power unit and the power conversion unit are universally used regardless of the type of servo motor and automatically suppression-controlled in real time, to achieve the convenience of the operator and minimize the non-processing time, thereby maximizing the productivity of the machine tool.

Further, although not illustrated in the figure, the tandem control system 1 for the machine tool according to an exemplary embodiment of the present disclosure may further include an input unit and a display unit.

The input unit is installed in the form of a switch or touch button on the operation panel or the main operation unit, etc., and performs a function to allow the operator to arbitrarily select to perform or not to perform the resonance suppression control in real time during parallel operation of the servo motor unit.

That is, if the function of the notch filter control unit is not selected during parallel operation of two servo motors of the servo motor unit of the tandem control system of the machine tool by the input unit, the resonance suppression control function of the tandem control system of the machine tool does not operate.

The display unit displays the damping coefficient value, natural frequency value, pole calculated value, zero-point calculated value, notch filter coefficient value, resonance attenuation command value, and as a result, the operator may visually check whether the presence and the control state of the resonance suppression when two servo motors of the servo motor unit are operated in parallel in real time.

Although not particularly limited thereto, the display unit may be constituted by an LCD, LED, PDP monitor, etc., in the main operation unit or the numerical control unit.

As illustrated in FIG. 8, a method for controlling the tandem control system of a machine tool according to an exemplary embodiment of the present disclosure includes storing basic data (S1), calculating a damping coefficient and a natural frequency of a servo motor unit (S2), calculating a pole of a tandem control system (S3), calculating a zero-point of the notch filter unit (S4), calculating a notch filter coefficient (S5), performing a PLC (S6), performing by a servo drive (S7), applying power of a power conversion unit (S8), storing feedback information (S9), outputting a resonance attenuation command (S10), and storing data in real time (S11). In each step, specifically, execution or contents of the system or device are the same as the tandem control system of the machine tool of the specification of the present disclosure, so hereinafter, the singularity of the method for controlling the tandem control system of the machine tool will be mainly described.

The basic data storage unit 4311 stores basic data for the servo motor unit and the notch filter unit for tandem control. The operator may perform information on a maximum value of a linkage magnetic flux by an equivalent permanent magnet, an angular speed at an operation point, a DC gain of the notch filter unit, an inductance of a winding of a stator of the servo motor unit, a pole constant of the servo motor unit, state winding resistance of the servo motor unit, and a rotator inertia moment of a circuit thermo motor unit through the numerical control unit 100 or the main operation unit 200, and stores the information in the PLC 300 in the form of the program.

After the storing of the basic data (S1), the damping coefficient and the natural frequency of the servo motor unit are calculated. That is, the damping coefficient and the natural frequency of the servo motor unit are calculated through Equation 5 by the damping coefficient calculation unit and the natural frequency calculation unit.

After the calculating of the damping coefficient and the natural frequency of the servo motor unit (S2), the pole calculation unit of the tandem control system calculates the pole of the tandem control system by Equation 3.

After the calculating of the pole of the tandem control system (S3), the zero-point calculation unit of the notch filter unit calculates the zero-point of the notch filter unit by Equation 4.

After the calculating of the zero-point of the notch filter unit (S4), the coefficient calculation unit calculates the notch filter coefficient of the notch filter unit by Equation 8 through the basic data stored in the basic data storage unit, the calculated damping coefficient and natural frequency of the servo motor unit, the pole of the tandem control system, and the zero-point of the notch filter unit.

After the calculating of the notch filter coefficient (S5), the PLC performs the control command through communication with the numerical control unit or the main operation unit.

After the performing of the PLC (S6), the servo drive performs the control command transferred from the PLC.

After the performing by the servo drive (S7), the power conversion unit applies current to the servo motor unit including the first servo motor and the second servo motor according to a signal of the servo drive.

After the applying of the power of the power conversion unit (S8), the feedback data storage unit stores the location and speed feedback information of the first servo motor generated when operating the first servo motor in parallel to the second servo motor and stores the location and speed feedback information of the second servo motor generated when operating the second servo motor in parallel to the first servo motor.

After the storing of the feedback information (S9), the command unit outputs the resonance attenuation command by Equation 6 in real time according to the notch filter coefficient calculated by the coefficient calculation unit, and transfers the output resonance attenuation command to the notch filter unit.

After the outputting of the resonance attenuation command (S10), as the current applied to the power conversion unit is blocked by the notch filter unit through the notch filter coefficient and resonance attenuation command calculated in real time, the resonance suppression through the tandem control is performed in real time.

Further, after the outputting of the resonance attenuation command (S10), a current notch filter coefficient calculated in real time and the resonance attenuation command output in real time are stored.

Accordingly, the method for controlling the tandem control system for the machine tool according to the present disclosure controls resonance suppression which occurs when operating two servo motors as one power conversion unit and one servo drive in parallel through tandem control by calculating a notch filter coefficient of a notch filter unit in real time by a notch filter control unit and stably setting operating resonance suppression which occurs when operating two servo motors into one power conversion unit and one servo drive in parallel regardless of the type of servo motor or a capacity of the servo motor through tandem control as blocking or applying current transferred to the power conversion unit with the notch filter unit by the calculated notch filter coefficient in real time to enhance convenience of an operator and finally controls an apparatus driven by an automatic tool exchanger or an automatic palette changer to reduce manufacturing cost, and enhance reliability by noise reduction, and can be universally used regardless of the type of servo motor and the capacity of the serve motor, thereby increasing compatibility of the tandem control system, and as resonance suppression is performed by a scheme of applying or blocking the current transferred to the power conversion unit by the notch filter unit according to a resonance attenuation command through the notch filter coefficient calculated in real time, an unnecessary component is removed to achieve miniaturization of the machine tool and the tandem control system for the machine tool and maximize spatial utilization.

The effect of the tandem control system and the method for controlling the same according to the present disclosure will be described in more detail with reference to FIGS. 6 and 7. FIG. 6 is a block diagram for a configuration of a notch filter control unit of a servo drive of the tandem control system for a machine tool according to an exemplary embodiment of the present disclosure and FIG. 7 is a graph for describing a process of outputting a resonance attenuation command through a pole-zero point offset technique in a command unit of the tandem control system for a machine tool according to an exemplary embodiment of the present disclosure. In FIGS. 6 and 7, a solid line indicates a parallel operation of two servo motors in the servo control apparatus in the related art, and a dotted line indicates a state to which the tandem control system and the method for controlling the same according to the present disclosure are applied.

As can be seen in FIGS. 9 and 10, in the case of a machine tool in the related art to which the tandem control system and the method for controlling the same according to the present disclosure are not applied, resonance occurs, and the phase also shows approximately 9 degrees based on 180 degrees. On the contrary, when the tandem control system for the machine tool and the method for controlling the same according to the present disclosure are applied, there is no inflection point, so there is no resonance, so resonance is completely suppressed, and the phase degree also shows 57 degrees based on 180 degrees.

Specifically, for a frequency response of G(S) (dotted-dotted line in FIGS. 9 and 10), which is the transfer function of the mathematical model of the tandem control, the resonance occurs at 22.9 rad/sec, and a phase margin shows an unstable response as 9 degrees. However, it can be seen that due to the notch filter with the transfer function H(S) (dashed line in FIGS. 9 and 10), a resonance point magnitude that increases up to 19 dB is attenuated, and the frequency response of $G_O(S)$, the transfer function of the entire tandem control system with a phase margin of 57 degrees shows a stable response in which the resonance is suppressed.

As a result, the tandem control system and the method for controlling the same according to the present disclosure may guarantee the stability and reliability of approximately 5 times or more than in the related art.

That is, in the tandem control system for the machine tool and the method for controlling the same according to the present disclosure, the calculation unit calculates the notch filter coefficient of the notch filter unit in real time through Equations 6 and 8, and the command unit reflects the notch filter coefficient and outputs the resonance attenuation command and controls the current supplied to the first servo motor and the second servo motor by blocking or applying the current applied to the power conversion unit to control the resonance suppression during the tandem control of simultaneously controlling two servo motors with one power conversion unit in real time, thereby securing stability and reliability of approximately 5.2 times against disturbance.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

DESCRIPTION OF MAIN REFERENCE NUMERALS OF DRAWINGS

1: Tandem control system
10: First servo drive
11: First servo drive
20: First inverter
21: Second inverter
30: First servo motor
31: Second servo motor
100: Numerical control unit
200: Main operation unit
300: PLC
400: Servo drive
410: Output unit
411: Speed signal output unit
412: Torque signal output unit
420: Notch filter unit
430: Notch filter control unit
431: Memory unit
4311: Basic data storage unit
4312: Feedback data storage unit
4313: Real-time data storage unit
432: Operating unit
4321: Damping coefficient calculation unit
4322: Natural frequency calculation unit
4323: Pole calculation unit
4324: Zero-point calculation unit
4325: Coefficient calculation unit
433: Command unit
500: Power conversion unit
600: Servo motor unit
610: First servo motor
620: Second servo motor

The invention claimed is:

1. A tandem control system for machine tool, comprising:
a numerical control unit;
a main operation unit;
a PLC performing a control command through communication with the numerical control unit or the main operation unit;
a servo drive having a notch filter unit and performing the control command of the PLC;
a servo motor unit driven by controlling the servo drive; and
a power conversion unit electrically connected to the servo motor unit and the servo drive to apply current to the servo motor unit,
wherein the servo drive performs resonance suppression according to an operation of the servo motor by adjusting an application state of the current applied to the power conversion unit according to a change in notch filter coefficient of the notch filter unit, which is calculated in real time,
wherein the servo drive includes:
an output unit outputting an operation speed signal of the servo motor unit and a torque signal transferred to the power conversion unit, and a notch filter control unit calculating the notch filter coefficient of the notch filter unit in real time, and controlling whether to apply the current transferred to the power conversion unit by the calculated notch filter coefficient, wherein the servo motor unit includes:

a first servo motor and a second servo motor connected in parallel to each other, and according to the real-time change of the notch filter coefficient of the notch filter unit, resonance suppression which occurs during tandem control of the first servo motor and the second servo motor is controlled by adjusting, in real time, whether the current transferred to the first servo motor and the second servo motor, respectively is applied through the power conversion unit, wherein the notch filter control unit includes:

a memory unit storing information for the tandem control for suppressing the resonance generated during the parallel operation of the first servo motor and the second servo motor, an operating unit calculating the notch filter coefficient of the notch filter unit through the information stored in the memory unit, and a command unit performing the resonance suppression through the tandem control in real time by blocking the current applied to the power conversion unit by the notch filter unit through a resonance attenuation command according to a result of the operating unit, wherein the memory unit includes:

a basic data storage unit storing information on a maximum value of a linkage magnetic flux by an equivalent permanent magnet, an angular speed at an operation point, a DC gain of the notch filter unit, an inductance of a winding of a stator of the servo motor unit, a pole constant of the servo motor unit, state winding resistance of the servo motor unit, and a rotator inertia moment of a circuit thermo motor unit, a feedback data storage unit storing location and speed feedback information of the first servo motor generated when operating the first servo motor in parallel to the second servo motor and storing the location and speed feedback information of the second servo motor generated when operating the second servo motor in parallel to the first servo motor, and a real-time data storage unit storing a real-time notch filter coefficient of the notch filter unit calculated by the operating unit and a current resonance attenuation command output from the command unit.

2. The tandem control system for a machine tool of claim 1, wherein the operating unit includes a damping coefficient calculation unit calculating a damping coefficient of the servo motor unit by data stored in the basic data storage unit, a natural frequency calculation unit calculating a natural frequency of the servo motor unit by the data stored in the basic data storage unit, a pole calculation unit calculating a pole of the tandem control system based on the data stored in the basic data storage unit, a calculation value of the damping coefficient calculation unit, and a calculation value of the natural frequency calculation unit, a zero-point calculation unit calculating the zero-point of the notch filter unit based on the data stored in the basic data storage unit, the calculation value of the damping coefficient calculation unit, and the calculation value of the natural frequency calculation unit, and a coefficient calculation unit calculating the notch filter coefficient based on the data stored in the basic data storage unit, the calculation value of the damping coefficient calculation unit, the calculation value of the natural frequency calculation unit, a calculation value of the pole calculation unit, and a zero-point value of the zero-point calculation unit.

3. The tandem control system for a machine tool of claim 2, wherein the command unit outputs a resonance attenuation command through a pole-zero point offset technique based on the data stored in the basic data storage unit, the calculation value of the damping coefficient calculation unit, the calculation value of the natural frequency calculation unit, the calculation value of the pole calculation unit, the zero-point value of the zero-point calculation unit, and a notch filter coefficient value of the coefficient calculation unit.

4. The tandem control system for a machine tool of claim 1, wherein the output unit includes a speed signal output unit outputting an operation speed signal of the servo motor unit according to a location command transferred from the numerical control unit and a feedback signal transferred from the feedback data storage unit, and a torque signal output unit outputting an effective torque signal transferred to the power conversion unit in order to drive the servo motor unit according to a speed signal transferred from the speed signal output unit and the feedback signal transferred from the feedback data storage unit.

5. A method for controlling a tandem control system for a machine tool, the method comprising:

storing basic data for a servo motor unit and a notch filter unit for tandem control;

calculating a damping coefficient and a natural frequency of the servo motor unit;

calculating a pole of a tandem control system;

calculating a zero-point of a notch filter unit;

calculating a notch filter coefficient of the notch filter unit through the stored basic data, and the calculated damping coefficient and natural frequency of the servo motor unit, the pole of the tandem control system, and the zero-point of the notch filter unit;

performing, by a PLC, a control command for communication with a numerical control unit and or a main cooperation unit;

performing, by a servo drive, the control command transferred from the PLC;

applying, by a power conversion unit, current to a servo motor unit including a first servo motor and a second servo motor according to a signal of the servo drive;

storing location and speed feedback information of the first servo motor generated when operating the first servo motor in parallel to the second servo motor and location and speed feedback information of the second servo motor generated when operating the second servo motor in parallel to the first servo motor; and outputting a resonance attenuation command in real time according to the calculated notch filter coefficient, wherein resonance suppression through the tandem control is performed in real time by blocking current applied to the power conversion unit by the notch filter unit through the notch filter coefficient calculated in real time and the resonance attenuation command.

6. The method for controlling a tandem control system for a machine tool of claim 5, further comprising:

after the outputting of the resonance attenuation command, storing a current notch filter coefficient calculated in real time and the resonance attenuation command output in real time.

\* \* \* \* \*